(12) United States Patent
Bengston et al.

(10) Patent No.: US 11,303,779 B2
(45) Date of Patent: Apr. 12, 2022

(54) HALFTONE IMAGE CREATION

(71) Applicants: Hewlett-Packard Development Company, L.P., Spring, TX (US); PURDUE RESEARCH FOUNDATION, West Lafayette, IN (US)

(72) Inventors: Kurt Robert Bengston, Boise, ID (US); Wan-Eih Huang, West Lafayette, IN (US); Tongyang Liu, West Lafayette, IN (US); Jan P Allebach, West Lafayette, IN (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 146 days.

(21) Appl. No.: 16/769,360

(22) PCT Filed: Jan. 26, 2018

(86) PCT No.: PCT/US2018/015510
§ 371 (c)(1),
(2) Date: Jun. 3, 2020

(87) PCT Pub. No.: WO2019/147267
PCT Pub. Date: Aug. 1, 2019

(65) Prior Publication Data
US 2021/0195058 A1  Jun. 24, 2021

(51) Int. Cl.
*H04N 1/40* (2006.01)
*H04N 1/405* (2006.01)

(52) U.S. Cl.
CPC .......... *H04N 1/4057* (2013.01); *H04N 1/405* (2013.01); *H04N 1/4058* (2013.01)

(58) Field of Classification Search
CPC combination set(s) only.
See application file for complete search history.

(56) References Cited

U.S. PATENT DOCUMENTS

| | | |
|---|---|---|
| 5,766,807 A | 6/1998 | Delabastita et al. |
| 5,799,137 A | 8/1998 | Broddin et al. |
| 5,903,713 A | 5/1999 | Daels et al. |
| 6,252,675 B1 | 6/2001 | Jacobs |
| 6,995,873 B1 | 2/2006 | Mitchell et al. |
| 8,437,037 B2 | 5/2013 | Broddin et al. |

(Continued)

FOREIGN PATENT DOCUMENTS

| | | | |
|---|---|---|---|
| CN | 104902137 | | 9/2015 |
| JP | 3917200 | * | 5/2007 |
| WO | WO-1992006554 a1 | | 4/1992 |

*Primary Examiner* — Barbara D Reinier (57) ABSTRACT

Example implementations relate to halftone image creation. An example non-transitory machine-readable medium can include instructions executable to determine a highlight core shape and a shadow core shape of a microcell within a supercell. The instructions can be executable to determine growth sequences for a plurality of pixels within the highlight core and the shadow core and between the microcell and other microcells within the supercell, divide each of the plurality of pixels into a plurality of subpixels, and create a halftone image for an unequal resolution printing device using a constrained direct binary search model and based on the highlight core shape, shadow core shape, growth sequences, and the plurality of subpixels.

15 Claims, 8 Drawing Sheets

(56) References Cited

U.S. PATENT DOCUMENTS

| | | |
|---|---|---|
| 2004/0021883 A1 | 2/2004 | Sugizaki |
| 2004/0090654 A1 | 5/2004 | Minnebo et al. |
| 2008/0130054 A1 | 6/2008 | Wang et al. |
| 2013/0265612 A1 | 10/2013 | Chandu et al. |
| 2014/0253976 A1 | 9/2014 | Chandu |
| 2015/0055185 A1 | 2/2015 | Chandu |
| 2015/0163375 A1 | 6/2015 | Chandu |

* cited by examiner

HALFTONE IMAGE CREATION

BACKGROUND

Halftone is a reprographic technique that simulates continuous tone imagery through the use of dots, varying either in size or in spacing, generating a gradient-like effect. "Halftone" can also be used to refer specifically to the image that is produced by this process. Monochrome halftoning is a technique for rendering a continuous tone image into an image with binary or a few levels of gray on each pixel.

DETAILED DESCRIPTION

Monochrome halftoning is a technique for rendering a continuous tone image into an image with binary or a few levels of gray on each pixel. Halftoning models can be categorized into different architectures including, for instance, point-to-point processing (e.g., screening or dithering), neighborhood processing (e.g., error diffusion), and search-based algorithms, which may be iterative (e.g., direct binary search (DBS)).

Some halftoning approaches use the iterative search-based models, but also use mass computations to support the iterative search-based models. In such an approach, it may be challenging to generate halftoned images in real time by iterative search-based models. Screening and error diffusion may have less computational complexity but may design more inefficient offline halftoning models as compared to DBS.

Examples of the present disclosure can include the use of a hybrid screen approach using a screening model designed offline using DBS. A halftone image can be generated using a screening model, which can be integrated into a limited computational resources printing device (e.g., a low-cost printing device with limited computational resources).

Images (also referred to as "screens") can be classified based on textures they generate. For instance, in a cluster-dot image, clustered individual printing device addressable dots form a grid-like pattern. Gray levels can be produced by varying the clustered dots size. Another example, disperse-dot images, do not form clusters. Gray levels can be generated by varying the density (e.g., frequency) of dots. Clustered dots may be more stable than single isolated dots and may produce less dot gain as a fraction of area coverage. When using a limited computational resources printing device such as a laser printer based on an electrophotographic process, the printing device can have an unstable rendering output. In such an example, a cluster-dot image can be used. However, there may be a trade-off on the design of a cluster-dot image.

The frequency of the clustered dots can be referred to as the screen frequency. The image renders the detail better with higher screen frequency. On the other hand, a smaller sized image (e.g., higher screen frequency) results in fewer gray levels. Considering the implementation on a digital printing device, the screen frequency may be lower than the printing device resolution in order to form clusters. Examples of the present disclosure can utilize a supercell approach to address the trade-off between screen frequency and effective number of gray levels.

For equal resolution, a printing device addressable pixel has the same size in both horizontal and vertical direction, and a DBS or screening model can be applied directly (e.g., because the digital image pixels match the printing device addressable pixels). However, for unequal resolution, the printing device addressable pixel has different dimension in two directions. For instance, a horizontal scan direction can be 600 dots per inch (dpi), while a vertical process direction can be 400 dpi (e.g., height of a printing dot is $\frac{1}{400}$-inch, width of the printing dot is $\frac{1}{600}$-inch).

To address this, examples of the present disclosure allow for a digital image pixel with identical dimension to be used as a subpixel and a plurality of subpixels stretched with different numbers horizontally and vertically forming a simulated unequal resolution printing device addressable pixel. In a halftoning model, the subpixels within the same simulated printing device pixel can have a same binary condition to get close to a real printing output. Subpixel modeling can simulate unequal resolution printing pixels and associated multilevel output.

In some example of the present disclosure, a periodic image can be related to two vectors $z=[z_i, z_j]$ and $w=[w_i, w_j]$ defined as screen tile vectors. In order to cover the spatial domain with these two vectors, they are linearly independent. The screen angle can be defined as the angle between the tile vector and a j-axis. Screen tile vectors can be obtained from a desired lines per inch (lpi). In some examples, the associated printing device can have unequal spatial resolution, and the height and width of each printing dot can be X and Y, respectively. The screen tile vectors can be obtained from the relationship described in equation (1) below, where $R_{gcd}=\gcd(1/X, 1/Y)$ and gcd is the greatest common divisor:

$$\text{screen frequency}\left(\frac{\text{lines}}{\text{inch}}\right)v = \frac{R_{gcd}}{\|XR_{gcd}|w_i|, YR_{gcd}|w_j|\|} \quad (1)$$

Figure 1:
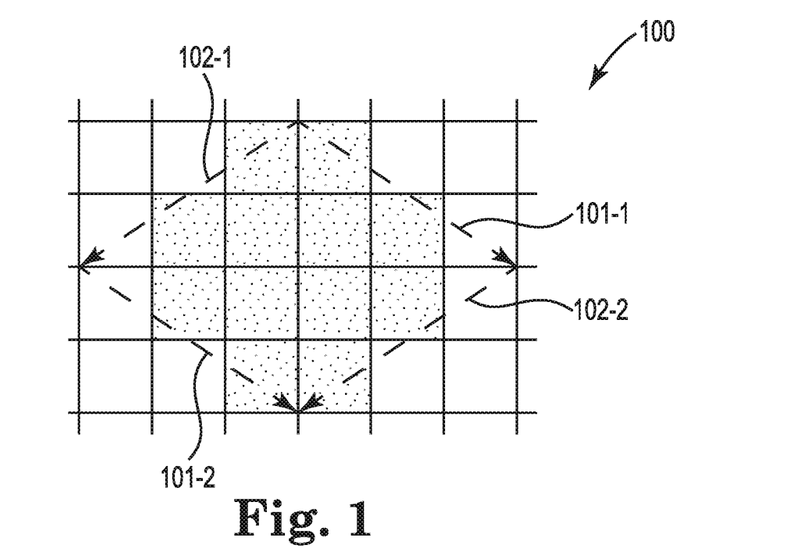
FIG. 1 illustrates a microcell according to an example.

FIG. 1 illustrates a microcell 100 according to an example. Two screen tile vectors 101 and 102 can be used to construct a parallelogram called a continuous parameter halftone cell (CPHC). Each tile vector can be repeated (e.g., 101-1, 101-2 and 102-1, 102-2) to construct the CPHC. An overlapping area of CPHC and a two-dimensional (2-D) discrete-parameter space can be used to design microcell 100.

The number of pixels N in a microcell, such as microcell 100 can be equal to $|\det[z^T w^T]|$. For instance, FIG. 1 illustrates microcell 100 obtained by the tile vectors $z=[2, 3]$ and $w=[2, -3]$, and microcell 100 contains 12 pixels. A dot can be created by turning on (e.g., adding color to) the pixels one-by-one. In some examples, a basic screen block (BSB), which is the smallest rectangle that can be tiled in horizontal and vertical direction can be used for storing the screen in a 2D array.

Figure 2:
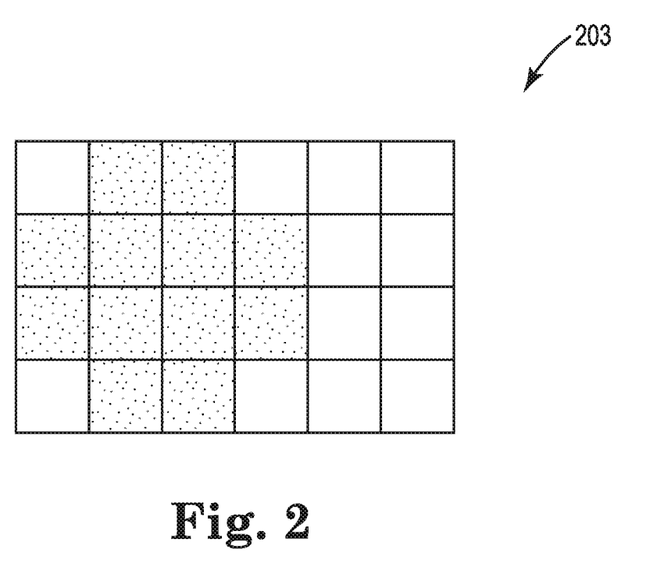
FIG. 2 illustrates a basic screen block (BSB) according to an example.

FIG. 2 illustrates a BSB 203 according to an example. The height of BSB 203 can be $$\frac{N}{gcd(z_j, w_j)},$$

and the width of BSB 203 can be $$\frac{N}{gcd(z_i, w_i)}.$$

In some examples, BSB 203 can correspond to microcell 100 illustrated in FIG. 1. A BSB can be repeated a plurality of times to create an array of microcells.

Figure 3:
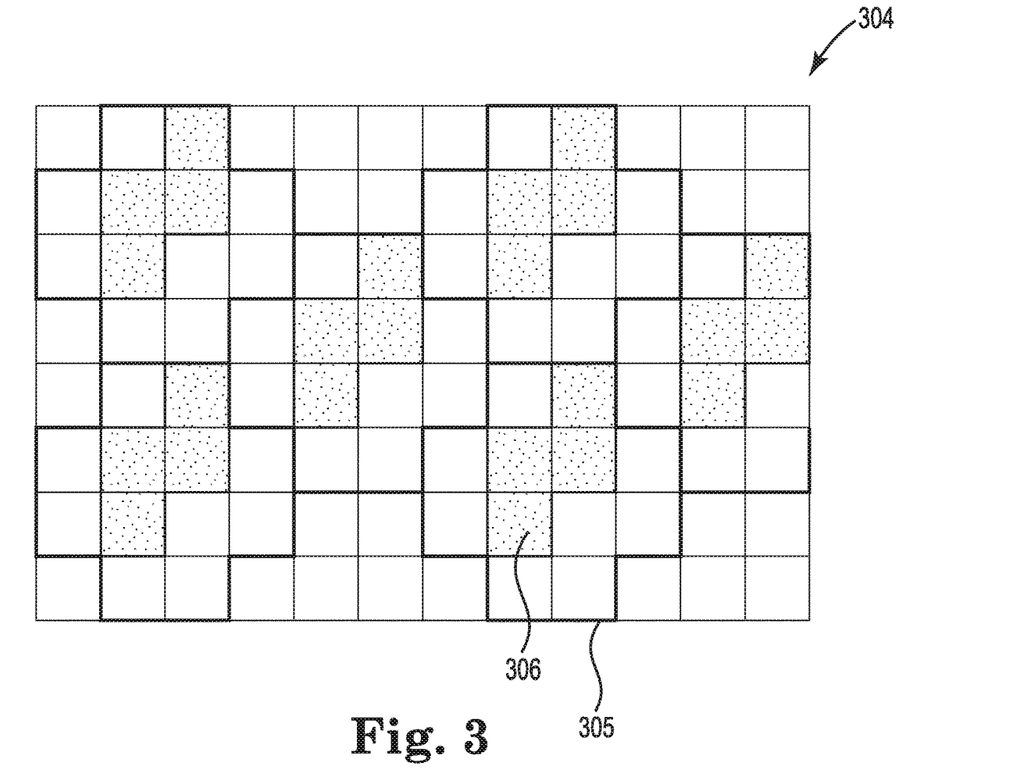
FIG. 3 illustrates a supercell according to an example.

FIG. 3 illustrates a supercell 304 according to an example. A supercell, such as supercell 304 can be obtained by tiling BSBs in a 2D space and can be the image used for thresholding a continuous tone image. For instance, supercell 304 is an example of a supercell having two BSBs both in horizontal and vertical directions. In some examples, the height and width of supercell 304 can be arbitrary integers. However, in practical implementation, if the screen size is bigger, more memory may be used. If the screen size is smaller, the periodic patterns may be more obvious. A supercell can be a plurality of sizes, and in some examples of the present disclosure a supercell can be 20×24 pixels.

Once a supercell is set, highlight core and shadow core regions for a stochastic dot texture can be determined. Within supercell 304 can be seen microcell 305 and highlight core 306, both of which will be discussed further herein with respect to FIG. 4.

Figure 4:
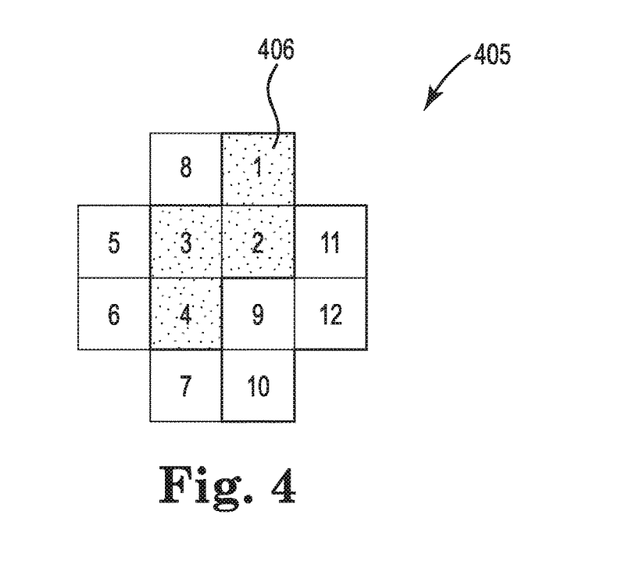
FIG. 4 illustrates a microcell with an asymmetric highlight core according to an example.

FIG. 4 illustrates a microcell 405 with an asymmetric highlight core 406 according to an example. Microcell 405 and highlight core 406 can be akin to microcell 305 and highlight core 306 illustrated in FIG. 3, in some examples. Microcell 405 can include a shadow core outside of highlight core 406 (e.g., including pixels 5-12) in some examples. In some instances, a highlight core growth sequence can include turning on pixels 1, 2, 3, 4 in a particular order, and a shadow core growth sequence can include turning on pixels 5, 6, 7, 8, 9, 10, 11, and 12 in a particular order.

A microcell growth sequence of each highlight core may not be the same, allowing spatial freedom in halftoned patterns. The highlight core shape can be determined by different situations. For example, a square highlight core may be suitable for conventional round dot cluster patterns. In some examples of the present disclosure, an asymmetric highlight core (e.g., S-shaped core) can be used so that an S-shape structure can be achieved in a midtone phase, as will be discussed further herein.

Figure 5:
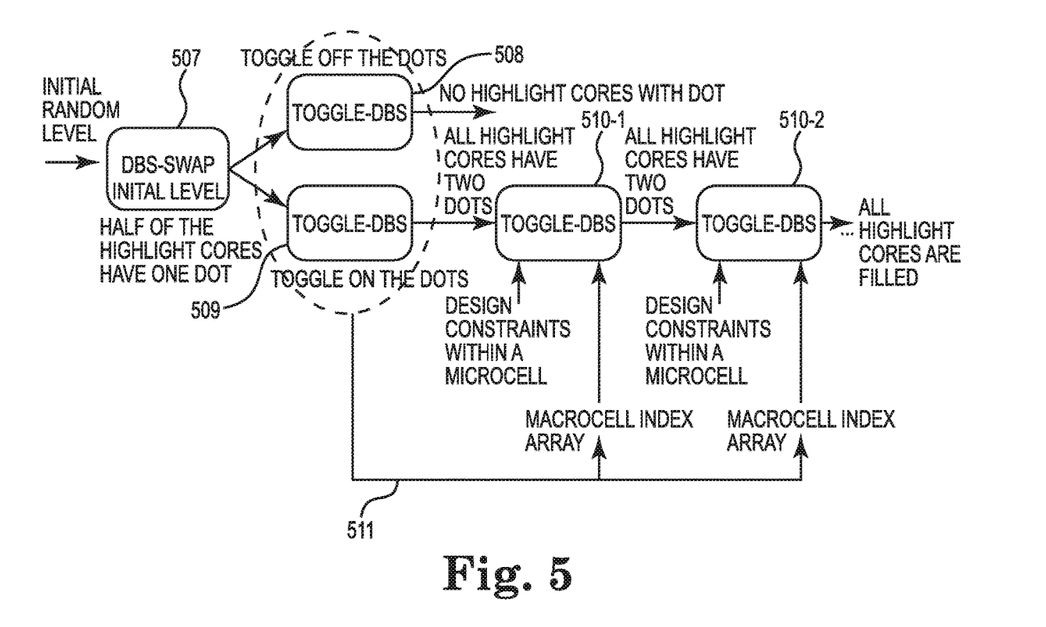
FIG. 5 illustrates a diagram of a method for halftone image creation according to an example.

FIG. 5 illustrates a diagram 506 of a method for halftone image creation according to an example. Screen generation can be divided into 3 phases: highlight, midtone, and shadow. FIG. 5 illustrates the highlight phase, according to an example. An initial random level can include half of the highlight cores having one dot filled (e.g., turned on).

At 507, to determine the halftoned pattern with an initial gray level, a constrained DBS swap can be used. The candidates of swap pixel can be neighboring pixels within the same highlight core, so the shape of the dot cluster within that core may change, but clustering can be maintained or the pixels in the highlight cores without dots, so a new dot-cluster will start to form, for each trial swap. The trial swap change may be allowed if it reduces a color difference metric, $\Delta E$. For example, the trial change to the halftone image resulting from a swap between a pixel that contains a dot and a pixel that contains no dot can be maintained so as to improve the appearance of the halftone texture. Subsequent to obtaining the halftoned pattern of initial level, a dot can be removed sequentially at 508 based on the halftoned pattern generated in a previous stage until no dot is in the screen. Similarly, a dot can be added sequentially at 509 based on the halftoned pattern generated in a previous stage until all highlight cores have one dot. How to select a dot to remove or add can be determined using constrained DBS toggle. The trial toggle (on or off) change can be allowed if it reduces $\Delta E$.

In some examples, DSB for unequal resolution can be used. For instance, DBS on an unequal resolution pixel with $1/X \times 1/Y$ dpi can be viewed as DBS on a plurality of equal resolution subpixels with $1/Z \times 1/Z$ dpi, which form a simulated unequal resolution pixel. $1/Z$ can be the smallest common multiple of $1/X$ and $1/Y$. On DBS swap or toggle operations, the subpixels within the same unequal resolution simulated pixel can switch to the same binary condition because they represent a single unit. Accordingly, the DBS equations can be rewritten.

For instance, it can be assumed that there are m×n subpixels within a simulated pixel with DBS toggle on pixel $m_0$ or swap $m_0$ and $m_1$. $m_{0ij}$ can be denoted as subpixels of $m_0$, and $m_{1kl}$ can be denoted as subpixels of $m_1$, where $i \in \{0, 1, \ldots, m-1\}$ and $j \in \{0, 1, n-1\}$. The trial halftone image can be represented by equation (2) illustrated below. If the operation is toggle, $a_0=1$ and $a_1=0$, otherwise, $a_1=-a_0$ in a swap operation. The trial error is given by equations (3) and (4) below.

$$g'[m] = g[m] + a_0 \sum_{i=0}^{m-1}\sum_{j=0}^{n-1} \delta[m - m_{0ij}] + a_1 \sum_{k=0}^{m-1}\sum_{l=0}^{n-1} \delta[m - m_{1kl}] \quad (2)$$

$$\Delta E = 2a_0 \sum_{i=0}^{m-1}\sum_{j=0}^{n-1} c_{\tilde{p}\tilde{e}}[m - m_{0ij}] + \\ 2a_1 \sum_{k=0}^{m-1}\sum_{l=0}^{n-1} c_{\tilde{p}\tilde{e}}[m - m_{1kl}] + a_0 a_1 \sum_{i=0}^{m-1}\sum_{j=0}^{n-1}\sum_{k=0}^{m-1}\sum_{l=0}^{n-1} c_{\tilde{p}\tilde{p}}[m_{0ij} - m_{1kl}] \quad (3)$$

$$c'_{\tilde{p}\tilde{e}}[m] = c_{\tilde{p}\tilde{e}}[m] + a_0 \sum_{i=0}^{m-1}\sum_{j=0}^{n-1} c_{\tilde{p}\tilde{p}}[m - m_{0ij}] + a_1 \sum_{k=0}^{m-1}\sum_{l=0}^{n-1} c_{\tilde{p}\tilde{p}}[m - m_{1lk}] \quad (4)$$

Equations (2), (3), and (4) can be circular convolution DBS models in some examples, and can have a wrap-around effect such that tiling the halftone pattern does not introduce artifacts at the boundary of the screen.

In the highlight phase, a design of a macrocell index array can be completed. This macrocell index array can be applied to each of a plurality of microcell levels, along with design constraints within the microcell, to generate halftoned patterns sequentially until all highlight cores are filled, for instance at 510-1 and 510-2. Using the same microcell index array can reduce an effort of optimization in some examples. If the macrocell sequence achieves a desired quality in lower gray levels (e.g., lighter gray levels), then the higher gray levels (e.g., darker gray levels) may also achieve a desired quality with the same macrocell sequence because the effect of the macrocell sequence may be more significant in lighter regions.

The midtone phase can include midtone gray levels generated by the same microcell index array obtained in the highlight phase and the microcell dot growing sequence. The shadow phase can include a mirroring approach used in shadow levels. Put another way, the dot profile function of a highlight core can be inverted and offset for a shadow level.

Figure 6:
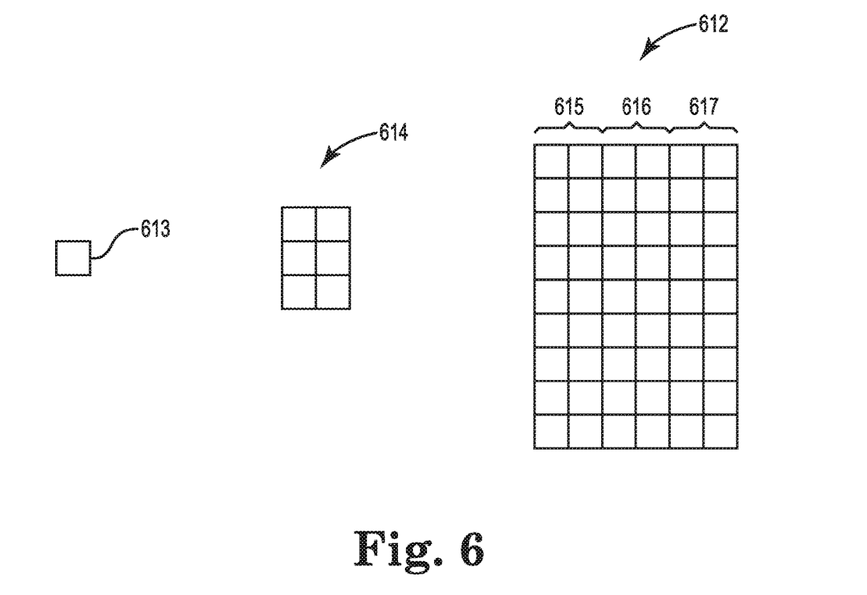
FIG. 6 illustrates subpixel modeling according to an example.

FIG. 6 illustrates subpixel modeling according to an example. Subpixel subpixel modeling can include partitioning a single, possibly non-square, pixel into an array of square sub-pixels. These can be grouped into an array in which the number of columns does not equal the number of rows, in order to account for a printing device with unequal resolution in the horizontal and vertical directions. They can be grouped into a number of adjacent, non-overlapping slivers that account for the ability of some printing devices to achieve subpixel modulation, for example, by switching a laser beam on and off within a fraction of a pixel (e.g., pulse-width modulation (PWM)). Taken together, the slivers comprise the entire pixel. In some examples, subpixel modeling can simultaneously account for both unequal resolution and subpixel modulation. Square subpixels can, in some examples, simplify a design and analysis of a halftone screen.

In some instances, subpixel modeling can be used to simulate unequal spatial resolution and multilevel output. A square subpixel 613 in a digital image can represent part of a desired printing device addressable dot. Such a subpixel can be extended in both horizontal and vertical direction to form a simulated unequal resolution printing device addressable dot 614. For instance, if a printing device has a resolution of 600 dpi in a horizontal direction and 400 dpi in a vertical direction, a simulated unequal resolution printing pixel can include a 3×2 array of square subpixels. Furthermore, considering multilevel output, a laser electrophotographic printing devices may support multilevel output by pulse width modulation (PWM). In such an example including two bits per pixel (bpp), a pixel 612 can divided into 3 slivers 615, 616, and 617. Thus, a simulated unequal resolution printing pixel for 2 bpp output can be composed of 9×6 subpixels. Additionally or alternatively, each 9×2 subpixel section in one sliver can turn on or off simultaneously. Put another way, when using PWM, laser beams can be switched on and off within a pixel (e.g., turned on or off for a subpixel).

Figure 7:
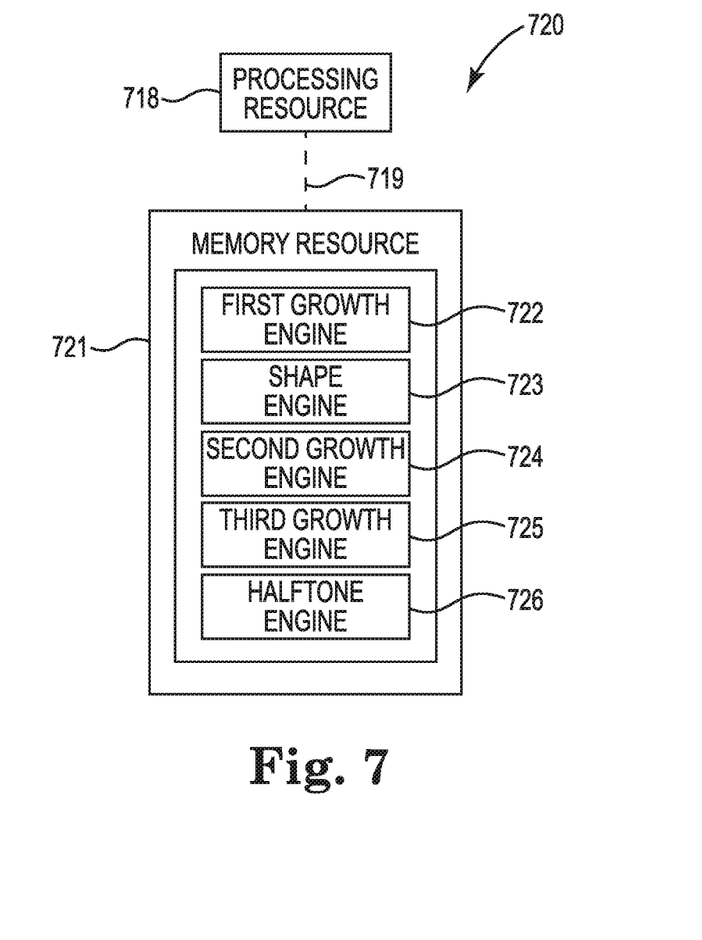
FIG. 7 illustrates a diagram of a controller including a processing resource, a memory resource, and engines according to an example.

FIG. 7 illustrates a diagram of a controller 720 including a processing resource 718, a memory resource 721, and engines 722, 723, 724, 725, and 726 according to an example. For instance, the controller 720 can be a combination of hardware and instructions for halftone image creation. The hardware, for example can include a processing resource 718 and/or a memory resource 721 (e.g., machine-readable medium (MRM), computer-readable medium (ORM), data store, etc.).

The processing resource 718, as used herein, can include a number of processing resources capable of executing instructions stored by a memory resource 721. The instructions (e.g., machine-readable instructions (MRI)) can include instructions stored on the memory resource 721 and executable by the processing resource 718 to implement a desired function (e.g., halftone image creation). The memory resource 721, as used herein, can include a number of memory components capable of storing non-transitory instructions that can be executed by processing resource 718. Memory resource 721 can be integrated in a single device or distributed across multiple devices. Further, memory resource 721 can be fully or partially integrated in the same device as processing resource 718 or it can be separate but accessible to that device and processing resource 718. Thus, it is noted that the controller 720 can be implemented on an electronic device and/or a collection of electronic devices, among other possibilities.

The memory resource 721 can be in communication with the processing resource 718 via a communication link (e.g., path) 719. The communication link 719 can be local or remote to an electronic device associated with the processing resource 718. The memory resource 721 includes engines (e.g., first growth engine 722, shape engine 723, second growth engine 724, third growth engine 725, and halftone engine 726). The memory resource 721 can include more engines than illustrated to perform the various functions described herein.

The engines 722, 723, 724, 725, and 726 can include a combination of hardware and instructions to perform a number of functions described herein (e.g., halftone image creation). The instructions (e.g., software, firmware, etc.) can be downloaded and stored in a memory resource (e.g., MRM) as well as a hard-wired program (e.g., logic), among other possibilities.

First growth engine 722 can determine a first growth sequence for a plurality of pixels within each of a plurality of microcells within a supercell. The first growth sequence, in some instances, can include an order in which to turn on the plurality of pixels within each of the plurality of microcells. For example, if a microcell has 12 pixels, it can be determined in which order each pixel is turn on. This determination can be made, in some instances, based on an order in which results in an image pleasing to the eye.

Shape engine 723 can determine a shape of a highlight core within each of the plurality of microcells. In some examples, the shape of the highlight core within each of the plurality of microcells is asymmetric. The asymmetric shape can include, for instance, an S-shape. In some examples, the shape of a shadow core within each of the plurality of microcells can be determined. The shadow core can surround the highlight core, for example.

Second growth engine 724 can determine a second growth sequence for a plurality of pixels within the supercell turned on within each highlight core. The second growth sequence, in some examples, can include an order in which to turn on the plurality of pixels within the supercell and within each highlight core. For instance, each microcell may turn on pixels within its highlight core in a different order. Additionally, a pixel may be turned on in a first highlight core, followed by a pixel being turned on in a second highlight core. The pixels may be in the same or different locations within their respective highlight cores. This may continue until a single pixel is turned on in each highlight core of the supercell, and then a second pixel may be turned on in the first highlight core beginning the cycle again.

Once all the highlight cores are turned on, the shadow core growth sequences can be determined. For instance, third growth engine 725 can determine a third growth sequence for a plurality of pixels within the supercell turned on outside each highlight core. The third growth sequence, in some instances, can include an order in which to turn on the plurality of pixels within the supercell and outside of each highlight core. Similar to the highlight core growth sequence, a shadow core pixel can be turned on in a first microcell, followed by a shadow core pixel in a second microcell, and the cycle can continue until a shadow core pixel is turned on in each microcell of the supercell. The cycle can continue until all of the shadow core pixels are turned on.

Halftone engine 726 can create a halftone image for an unequal resolution printing device associated with the controller based on the first growth sequence, the second growth sequence, and the third growth sequence. The created halftone image can have a reduced appearance of artifacts because the different growth sequences can reduce non-uniformity in the highlight and shadow cores where it is most visible and displeasing to the eye.

Figure 8:
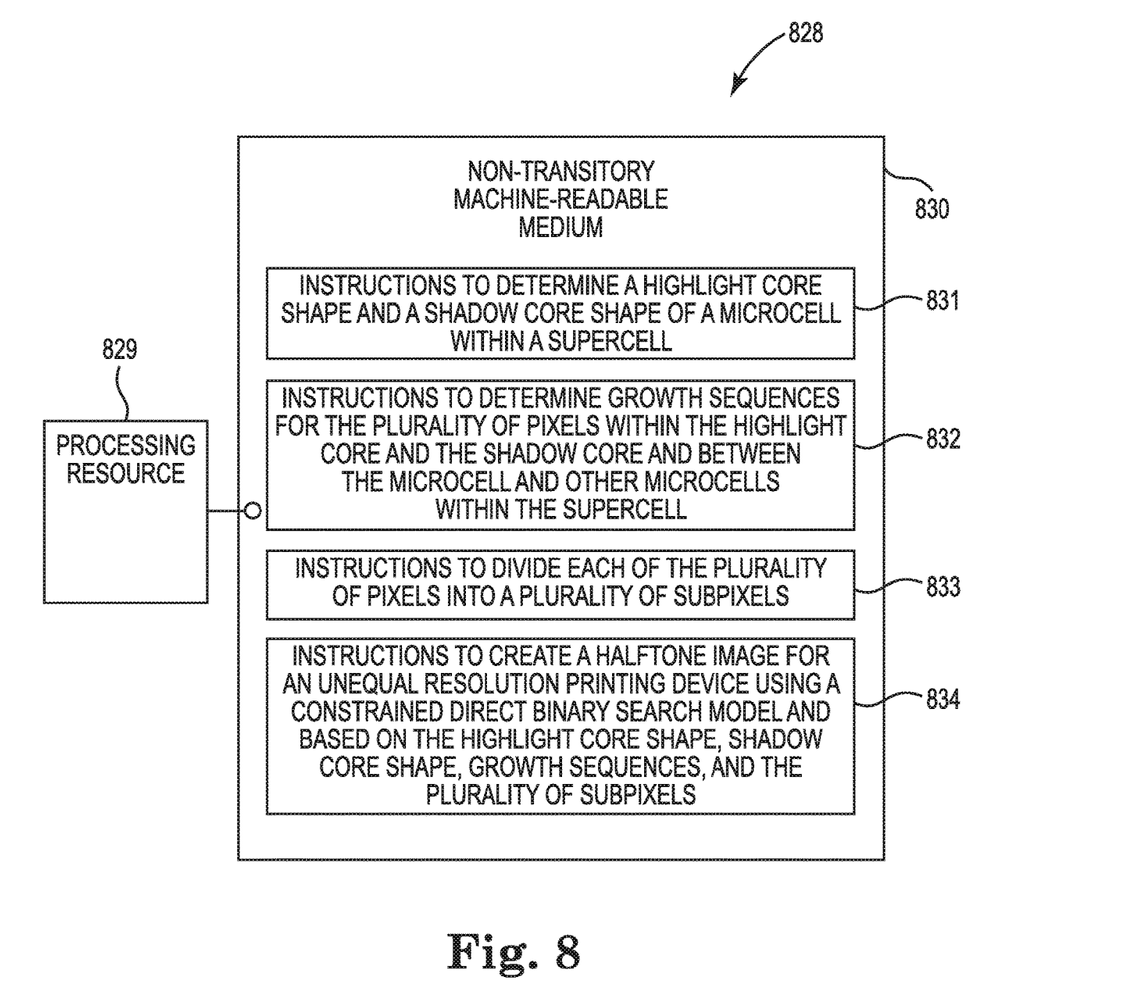
FIG. 8 illustrates a system for halftone image creation according to an example.

FIG. 8 illustrates a system 828 for halftone image creation according to an example. System 828 can be a computing device in some examples and can include a processing resource 829. System 828 can further include a non-transitory MRM 830, on which may be stored instructions, such as instructions 831, 832, 833, and 834. Although the following descriptions refer to a processing resource and a memory resource, the descriptions may also apply to a system with multiple processing resources and multiple memory resources. In such examples, the instructions may be distributed (e.g., stored) across multiple non-transitory MRMs and the instructions may be distributed (e.g., executed by) across multiple processing resources.

Non-transitory MRM 830 may be electronic, magnetic, optical, or other physical storage device that stores executable instructions. Thus, non-transitory MRM 830 may be, for example, Random Access Memory (RAM), an Electrically-Erasable Programmable Read-Only Memory (EEPROM), a storage drive, an optical disc, and the like on-transitory MRM 830 may be disposed within system 828, as shown in FIG. 8. In this example, the executable instructions 831, 832, 833, and 834 can be "installed" on the device. Additionally and/or alternatively, non-transitory MRM 830 can be a portable, external or remote storage medium, for example, that allows system 628 to download the instructions 831, 832, 833, and 834 from the portable/external/remote storage medium. In this situation, the executable instructions may be part of an "installation package". As described herein, non-transitory MRM 830 can be encoded with executable instructions for halftone image creation.

Instructions 831, when executed by a processing resource such as processing resource 829, can include instructions to determine a highlight core shape and a shadow core shape of a microcell within a supercell. The microcell can include a plurality of pixels. Determining the highlight core shape, which in some examples can be asymmetric, can be based on a microcell index array. The microcell index array can cluster pixels in different highlight core shapes to determine a shape most pleasing to the eye. A shadow core shape may be determined in a similar manner or based on the shape of the highlight core. For instance, the shadow core shape can be determined such that when placed around the highlight core a desired shape results (e.g., cross-shape).

Instructions 832, when executed by a processing resource such as processing resource 829, can include instructions to determine growth sequences for the plurality of pixels within the highlight core and the shadow core and between the microcell and other microcells within the supercell. For instance, beginning in a first highlight core, a pixel can be turned on. Next, a pixel in a second highlight core can be turned on, and this can continue until one pixel in each highlight core of the supercell is turned on. The pixels turned on may not be in a same location within their respective highlight cores. By doing this, the supercell can reduce the non-homogenous effects of turning on the same pixel in each highlight core.

A second highlight core pixel can be turned on in each highlight core in a similar manner until all of the highlight cores are turned on. Subsequently, shadow core pixels in each of the microcells can be turned on in a similar manner. However, the shadow core pixels may or may not be turned on in the same locations within their respective shadow cores.

Instructions 833, when executed by a processing resource such as processing resource 829, can include instructions to divide each of the plurality of pixels into a plurality of subpixels. For instance, a pixel can be divided into slivers, and the resulting plurality of subpixels can be used to simulate the unequal resolution of the printing device. The subpixels can allow for increased efficiency during PWM, in some examples.

Instructions 833, when executed by a processing resource such as processing resource 829, can include instructions to create a halftone image for an unequal resolution printing device using a constrained DBS model and based on the highlight core shape, shadow core shape, growth sequences, and the plurality of subpixels. For instance, using a simulation of the unequal resolution of the printing device, a halftone image pleasing to the eye can be created.

In some instances, the constrained DBS model can be a constrained circular convolution DBS model, a DBS model constrained by a compact rule, a DBS model constrained by a centroid rule, and/or a constrained DBS model having a Gaussian filter applied. For example, adding constraints to the DBS model can reduce or remove artifacts from halftone images that a DBS model may not be able to detect, remove, or reduce by itself.

Figure 9:
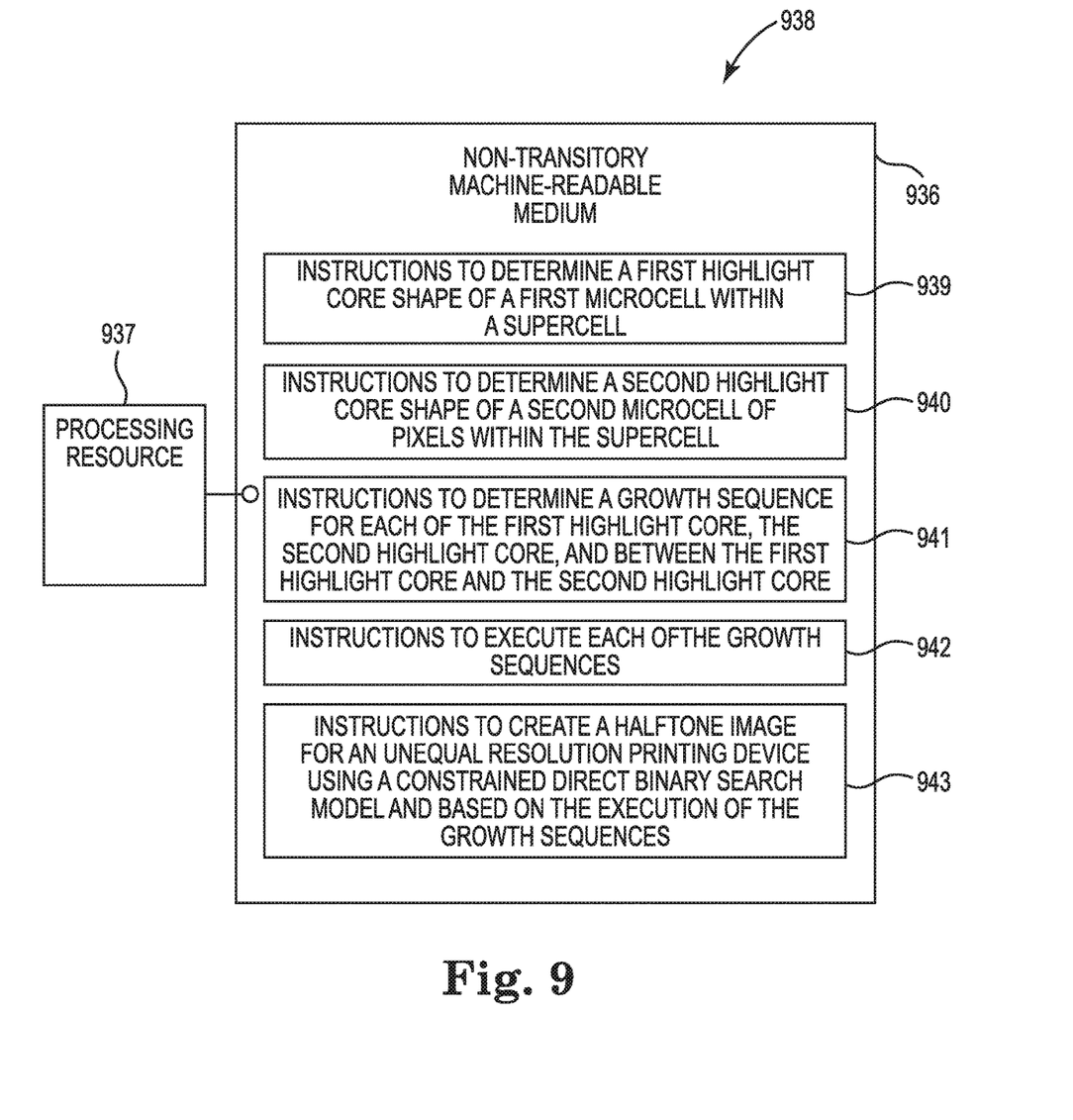
FIG. 9 illustrates another system for halftone image creation according to an example.

FIG. 9 illustrates another system for halftone image creation according to an example. System 938 can be akin to system 828 as described with respect to FIG. 8. Processing resource 937 and non-transitory MRM 936 can be akin to processing resource 829 and non-transitory MRM 830 as described with respect to FIG. 8.

Instructions 939, when executed by a processing resource such as processing resource 937, can include instructions to determine a first highlight core shape of a first microcell within a supercell. The first highlight core can be asymmetric, and in some instances, the first microcell includes a first plurality of pixels divided into slivers of a plurality of subpixels. For instance, the use of subpixels can increase the efficiency of an associated printing device to support multilevel PWM.

Instructions 940, when executed by a processing resource such as processing resource 937, can include instructions to determine a second highlight core shape of a second microcell of pixels within the supercell. In some examples, the second microcell can include a second plurality of pixels divided into slivers of a plurality of subpixels. In some instances, the second highlight core can have an asymmetric shape, and it can be the same or a different asymmetric shape as compared to the first highlight core. The first and the second highlight core can include the same number of pixels.

In some instances, the first and the second microcells can be created using a screen tile vector set that obtains a forty-five-degree screen angle for the unequal resolution printing device. Put another way, the screen tile vector can be chosen such that with an unequal resolution printing device, a forty-five-degree screen angle is obtained. Such a screen angle can reduce visual noise and can result in a screen frequency at a level small enough that it is not visible (e.g., about 141 lines per inch screen period).

Instructions 941, when executed by a processing resource such as processing resource 937, can include instructions to determine a growth sequence for each of the first highlight core, the second highlight core, and between the first highlight core and the second highlight core. Instructions 942, when executed by a processing resource such as processing resource 937, can include instructions to execute each of the growth sequences.

For instance, a growth sequence between the first highlight core and the second highlight core can include turning on a pixel of the second highlight core in response to turning on a pixel of the first highlight core. The pixels can be in different locations in their respective highlight cores. Said another way, execution can include turning on a pixel in a first position in the first highlight core, followed by a pixel in a second position in the second highlight core. A pixel in a third position can be turned on next in the first highlight core, followed by a pixel in the first position of the second highlight core. This can continue until all the pixels of both highlight cores are turned on. While two highlight cores are discussed here, more highlight cores may be present.

Instructions 943, when executed by a processing resource such as processing resource 937, can include instructions to create a halftone image for an unequal resolution printing device using a constrained DBS model and based on the execution of the growth sequences. The constrained DBS model can be used in the determination of the growth sequences, in some instances. The DBS model can be constrained to create a halftone image with reduced artifacts and improved viewing pleasure.

Figure 10:
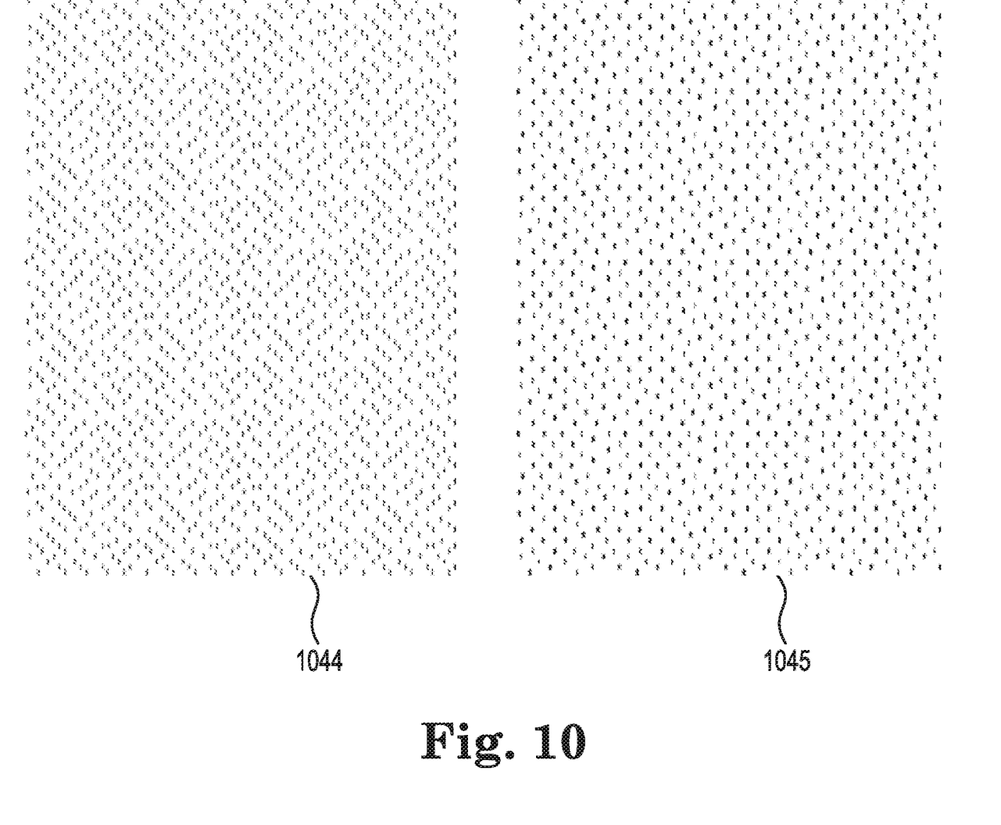
FIG. 10 illustrates a comparison of halftone images.
Figure 11:
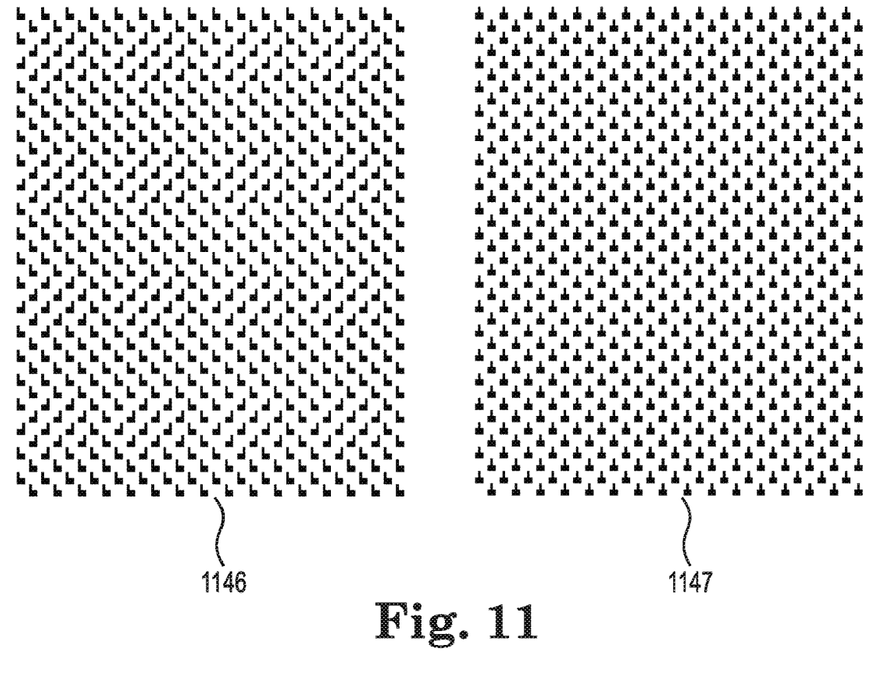
FIG. 11 illustrates another comparison of halftone images.
Figure 12:
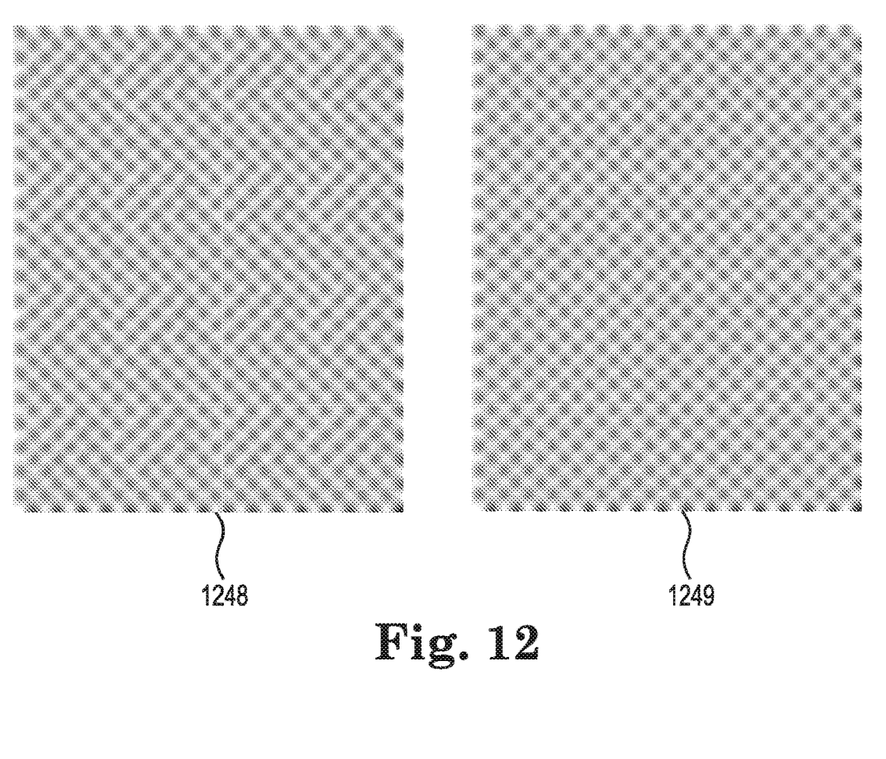
FIG. 12 illustrates yet another comparison of halftone images.

FIGS. 10, 11, and 12 illustrate comparisons of halftone images. For instance, the comparisons include the use of a hybrid screen design with multilevel and unequal spatial resolution output. A compact rule can be applied as a constraint when designing a hybrid screen. For instance, a newly added sliver can be adjacent to a previous one. Two halftoned patterns corresponding to the same gray level in FIG. 10 is an example of the impact of the compact rule. For example, left image 1044 generated without the compact rule means DBS is free to choose any sliver within the highlight cores. Alternatively, the newly added sliver is chosen from the slivers adjacent to the existing slivers in right image 1045 generated with compact constraint. In such an example, an objectionable diagonal structure is visible in left image 1044, while the compact rule reduces these artifacts in right image 1045.

A centroid (e.g., symmetric) rule can also be applied as a constraint in some examples. For instance, the difference of centroid shift of the cluster-dots can be set to be smaller than a particular threshold. FIG. 11 illustrates an example impact of a centroid rule with two halftoned patterns in the same gray level. The left halftoned pattern 1146 can be generated without the centroid rule such that there is an objectionable diagonal structure. The right halftone pattern 1147 can be generated with the centroid rule and appears smoother than pattern 1146.

FIG. 12 illustrates images 1248 and 1249, which represent patters 1146 and 1147, respectively, following application of a Gaussian filter. The Gaussian filter can make the images closer to perception through the human eyes in some examples.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein may be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. Further, as used herein, "a number of" an element and/or feature may refer to one or more of such elements and/or features.

What is claimed:

1. A non-transitory computer readable medium containing instructions executable by a processing resource to cause the processing resource to:
    determine a highlight core shape and a shadow core shape of a microcell within a supercell,
        wherein the microcell comprises a plurality of pixels;
    determine growth sequences for the plurality of pixels within the highlight core and the shadow core and between the microcell and other microcells within the supercell;
    divide each of the plurality of pixels into a plurality of subpixels; and
    create a halftone image for an unequal resolution printing device using a constrained direct binary search (DBS) model and based on the highlight core shape, shadow core shape, growth sequences, and the plurality of subpixels.

2. The medium of claim 1, further comprising the instructions executable to cause the processing resource to simulate the unequal resolution of the printing device using the plurality of subpixels.

3. The medium of claim 1, wherein the constrained DBS model comprises a constrained circular convolution DBS model.

4. The medium of claim 1, wherein the constrained DBS model comprises a DBS model constrained by a centroid rule.

5. The medium of claim 1, wherein the constrained DBS model comprises a DBS model constrained by a compact rule.

6. The medium of claim 1, wherein the constrained DBS model comprises a constrained DBS model having a Gaussian filter applied.

7. The medium of claim 1, wherein the highlight core shape is asymmetric.

8. A controller comprising a processing resource in communication with a memory resource including instructions executable to:
    determine a first growth sequence for a plurality of pixels within each of a plurality of microcells within a supercell;
    determine a shape of a highlight core within each of the plurality of microcells;

determine a second growth sequence for a plurality of pixels within the supercell turned on within each highlight core;

determine a third growth sequence for a plurality of pixels within the supercell turned on outside each highlight core; and create a halftone screen for an unequal resolution printing device associated with the controller based on the first growth sequence; the shapes of the highlight cores, the second growth sequence, and the third growth sequence.

9. The controller of claim 8; wherein the shape of the highlight core within each of the plurality of microcells is asymmetric.

10. The controller of claim 9, wherein the asymmetric shape is S-shaped.

11. The controller of claim 8, further comprising the instructions executable to determine a shape of a shadow core within each of the plurality of microcells.

12. The controller of claim 8, wherein:

the first growth sequence comprises an order in which to turn on the plurality of pixels within each of the plurality of microcells;

the second growth sequence comprises an order in which to turn on the plurality of pixels within the supercell and within each highlight core; and the third growth sequence comprises an order in which to turn on the plurality of pixels within the supercell and outside of each highlight core.

13. A non-transitory computer readable medium containing instructions executable by a processing resource to cause the processing resource to:

determine a first highlight core shape of a first microcell within a supercell, wherein the first microcell comprises a first plurality of pixels divided into slivers of a plurality subpixels;

determine a second highlight core shape of a second microcell of pixels within the supercell, wherein the second microcell comprises a second plurality of pixels divided into slivers of a plurality subpixels;

determine a growth sequence for each of the first highlight core, the second highlight core, and between the first highlight core and the second highlight core;

execute each of the growth sequences; and create a halftone screen for an unequal resolution printing device using a constrained direct binary search (DBS) model and based on the execution of the growth sequences.

14. The medium of claim 13, wherein the instructions executable to determine the growth sequence between the first highlight core and the second highlight core comprise instructions executable to cause the processing resource to turn on a pixel of the second highlight core in response to turning on a pixel of the first highlight core.

15. The medium of claim 13, further comprising instructions executable to cause the processing resource to create the first and the second microcells using a screen tile vector set to obtain a forty-five-degree screen angle for the unequal resolution printing device.

* * * * *